Patented Sept. 19, 1950

2,522,491

UNITED STATES PATENT OFFICE 2,522,491

RUBBERY COPOLYMER OF BUTADIENE AND ALPHA-METHYL 2,4-DICHLOROSTYRENE

Charles C. Clark, Kenmore, N. Y., assignor to Mathieson Chemical Corporation, a corporation of Virginia No Drawing. Application July 19, 1946, Serial No. 684,795

2 Claims. (Cl. 260—82.1)

My invention relates to a novel copolymer which is rubber-like in character and which is adapted for use as a substitute for natural rubber in many of its applications.

My copolymer is produced by reaction of butadiene-1,3 and alpha-methyl 2,4-dichlorostyrene, most suitably in aqueous emulsion. The extent to which the alpha-methyl dichlorostyrene enters into the reaction appears to be controlled or determined by its purity. This fact does not seem to have been recognized heretofore.

In the production of my copolymer, the relative amounts of butadiene and alpha-methyl dichlorostyrene employed may be varied, but in no case should so much of the alpha-methyl dichlorostyrene be used as to give to the product a plastic or resinous rather than a rubber-like character. In general, the greater the proportion of butadiene employed, the tougher, more elastic and tractable will be the copolymer. The copolymer may contain from about 10% to 30% by weight of the alpha-methyl dichlorostyrene as determined by chlorine analysis. Within the specified range I favor, as particularly advantageous, those copolymers containing from 10–15% of the alpha-methyl dichlorostyrene, especially as to those applications where elasticity and strength are considered of paramount importance. My copolymers by reason of their chlorine content are less inflammable in the unvulcanized state than halogen-free rubber substitutes heretofore proposed. Alpha-methyl 2,4-dichlorostyrene may be prepared by dehydration of the appropriate aromatic alcohols following the general procedure as described in Chemical and Engineering News, vol. 22, page 1559, September 25, 1944, and similarly described in Craig Patent No. 2,384,535.

As stated, the copolymer is most suitably prepared by reaction of the monomers in aqueous emulsion. Emulsifying agents which may be used with advantage include alkali metal salts of high molecular weight alkyl sulfonates, alkali metal alkyl benzene sulfonates, alkyl naphthalene sulfonates, alkali metal sulfoethyl oleate and salts of other sulfonated esters and oils as well as the more common soaps, such as sodium and ammonium oleate or laurate. Although the proportion of emulsifying agent is not critical, it is advantageous to employ the emulsifying agent in an amount equivalent to from about 0.5% to about 15% of the total weight of the monomers. Aliphatic alcohols having from 4 to 10 carbon atoms or equivalent compounds may be used in the emulsion as surface tension regulators.

Contrary to what would be expected, the copolymerization does not appear to be catalyzed by the presence of a peroxide such as benzoyl peroxide. Potassium persulfate, however, has been used in conjunction with potassium cobaltinitrite.

Purification of the alpha-methyl 2,4-dichlorostyrene, prior to its employment in the reaction yielding the copolymer, is achieved by agitating the impure monomer first with a solution of mercuric sulfate in dilute sulfuric acid, then with a cuprous chloride mixture prepared by adding cuprous chloride and copper powder to ammonium hydroxide, and finally with a 1% solution of potassium dichromate in 50% sulfuric acid. Before the treatment with the cuprous chloride mixture, the monomer is filtered through "Celite," described as an air-floated abrasive, to remove mercury salts, washed with water, dried, and passed through activated alumina. Following the cuprous chloride treatment, which is usually of about one hour's duration, and the treatment with the dichromate solution, the monomer is similarly filtered, dried and passed through activated alumina. Subsequent to the agitation with the dichromate solution, the monomer may be washed with dilute aqueous caustic and water and dried.

My invention is further illustrated by the following example which is not to be taken as in any way restrictive of the scope thereof:

The 2,4-alpha-methyl dichlorostyrene employed in this example had been purified in the manner above indicated. The butadiene was freshly distilled.

The monomers, together with the catalyst and other materials, were placed in a sealed glass tube which was rotated perpendicularly to the axis of a motor-driven shaft during the reaction.

The following copolymerization formula was used:

|  | Parts by Weight | Actual Weight, g. |
|---|---|---|
| Butadiene-1,3 | 68 | 26.5 |
| Alpha Methyl Dichlorostyrene(2,4) | 32 | 12.5 |
| Water | 180 | 70 |
| Soap (Rubber Reserve) | 5 | 1.7 |
| Dodecyl Mercaptan | 0.35 | 0.137 |
| Potassium Persulfate | 0.1 | .039 |
| Potassium Cobaltinitrite | 0.1 | .039 |

The soap was dissolved in boiling distilled water. After the soap solution was cool, the potassium persulfate and potassium cobaltinitrite were dissolved in it. The dodecyl mercaptan was dissolved in the uninhibited alpha-methyl dichlorostyrene. The glass polymerization tube which held 180 cc. was washed with cleaning solution and rinsed with distilled water until the rinsings were neutral to litmus. The tube containing the emulsion medium and the alpha-methyl dichlorostyrene was cooled in Dry Ice and chloroform, the butadiene added and the tube sealed. After the tube had reached room temperature following removal from the Dry Ice bath, it was wrapped in several layers of cloth and fastened to the bottle polymerizer wheel. At the end of 160 hours the tube was removed, chilled in ice and salt and opened. The emulsion had a good appearance. A few small particles of a sticky, pink substance were floating on its surface. The latex emulsion which weighed 148.3 g. was steamed after adding 0.1% of hydroquinone (basis of the total monomers) and 1.8 g. of oil collected in the receiver. This oil analyzed 38.0% chlorine and 133 iodine value. Theory for alpha-methyl dichlorostyrene is 38.0% chlorine and 136 iodine value. 14.4% of the original alpha-methyl dichlorostyrene was thus recovered.

0.1% hydroquinone mono benzyl ether was added to the steamed latex. The pH was brought up to 9 with 10% caustic soda and the rubber coagulated from the latex with salt and 10% HCl. A mass of very sticky crumbs was obtained and dried. The weight of the dried rubber was 17.0 g. The analysis on the rubber was as follows:

Total chlorine by Parr bomb___per cent__ 5.13
Iodine value _____ 259
Toluene solubility _____per cent__ 61.77
Molecular weight on toluene soluble fraction (viscosity method) _____ 42900

Alpha-methyl dichlorostyrene monomer has a molecular weight of 187 and contains 38.0% chlorine. Therefore $5.13 \div 0.38 = 13.5\%$ alpha-methyl dichlorostyrene in the rubber.

I claim:
1. A rubbery copolymer of alpha-methyl 2,4-dichlorostyrene and butadiene-1,3, prepared from alpha-methyl 2,4-dichlorostyrene which has been purified by first agitating it with a solution of mercuric sulfate in dilute sulfuric acid, then with a cuprous chloride mixture prepared by adding cuprous chloride and copper powder to ammonia hydroxide and finally with a solution of potassium dichromate in sulfuric acid, said copolymer containing 10-30% of alpha-methyl 2,4-dichlorostyrene as determined by chlorine analysis.

2. A rubbery copolymer of alpha-methyl 2,4-dichlorostyrene and butadiene-1,3, prepared from alpha-methyl 2,4-dichlorostyrene which has been purified by first agitating it with a solution of mercuric sulfate in dilute sulfuric acid, then with a cuprous chloride mixture prepared by adding cuprous chloride and copper powder to ammonia hydroxide and finally with a solution of potassium dichromate in sulfuric acid, said copolymer containing 10-15% of alpha-methyl 2,4-dichlorostyrene as determined by chlorine analysis.

CHARLES C. CLARK.

REFERENCES CITED

The following references are of record in the file of this patent:

UNITED STATES PATENTS

| Number | Name | Date |
|---|---|---|
| 2,384,535 | Craig | Sept. 11, 1945 |

FOREIGN PATENTS

| Number | Country | Date |
|---|---|---|
| 570,596 | Great Britain | July 13, 1945 |

OTHER REFERENCES

Bachman et al.: J. Am. Chem. Soc., 70 622-4 (1948).

Michalek et al.: Chem. Eng. News, 22, 1559-63 (Sept. 25, 1944).